(12) United States Patent
Jensen et al.

(10) Patent No.: US 9,956,839 B2
(45) Date of Patent: May 1, 2018

(54) SYSTEM FOR INCREASING STIFFNESS OF A LIGHT-DUTY MACHINE COMPONENT

(71) Applicant: Caterpillar Inc., Peoria, IL (US)

(72) Inventors: Jeffrey Edward Jensen, Dunlap, IL (US); Jacob Carl Wyss, Eureka, IL (US)

(73) Assignee: Caterpillar Inc., Peoria, IL (US)

( * ) Notice: Subject to any disclaimer, the term of this patent is extended or adjusted under 35 U.S.C. 154(b) by 185 days.

(21) Appl. No.: 14/887,461

(22) Filed: Oct. 20, 2015

(65) Prior Publication Data

US 2017/0106708 A1  Apr. 20, 2017

(51) Int. Cl.
*B60G 9/00* (2006.01)
*B60B 35/00* (2006.01)

(52) U.S. Cl.
CPC .............. *B60G 9/003* (2013.01); *B60B 35/00* (2013.01)

(58) Field of Classification Search
CPC . B60G 9/00; B60G 9/003; B60G 7/04; B60G 2204/116; B60G 2300/09; B60G 2400/60; B60G 2206/30; B60G 21/051; B60G 21/055; B60G 2204/1224
USPC .................................................. 280/124.106
See application file for complete search history.

(56) References Cited

U.S. PATENT DOCUMENTS

| | | | |
|---|---|---|---|
| 4,693,486 A | 9/1987 | Pierce et al. | |
| 5,636,857 A * | 6/1997 | Tandy, Jr. ................ | B60G 9/00 267/31 |
| 7,717,442 B2 | 5/2010 | Chalin | |
| 8,678,407 B2 | 3/2014 | Eveley | |
| 2002/0185914 A1 * | 12/2002 | Clay ................... | B60G 17/0195 303/166 |
| 2003/0168820 A1 * | 9/2003 | Hagan ...................... | B60G 9/00 280/5.511 |
| 2007/0145705 A1 * | 6/2007 | Ramsey ................. | B60G 7/001 280/124.128 |
| 2008/0100017 A1 * | 5/2008 | Bitter .................... | B60G 17/005 280/124.16 |
| 2011/0175314 A1 * | 7/2011 | Ohra-aho ............... | B60G 9/003 280/124.106 |
| 2016/0280026 A1 * | 9/2016 | Phillips .................... | B60G 9/02 |

FOREIGN PATENT DOCUMENTS

| | | | | |
|---|---|---|---|---|
| CN | 203600903 | | 5/2014 | |
| EP | 1839906 A1 * | | 10/2007 | ............. B60B 35/04 |

* cited by examiner

*Primary Examiner* — Karen Beck
(74) *Attorney, Agent, or Firm* — Jeff A. Greene

(57) ABSTRACT

A system for increasing stiffness and/or strength of a light-duty machine component having propensity for flexing along an elongated axis is provided. The system includes a pair of receptacles disposed on the machine component, wherein each of the receptacles is located in a spaced apart relation to one another and disposed parallel to the elongated axis. The system further includes at least one backing member corresponding to a distance between the pair of receptacles. The backing member is configured to define at least a pair of openings therethrough. The pair of openings is configured to axially align with the pair of receptacles defined on the machine component. The system further includes a plurality of fasteners such that at least one fastener is received in each pair of axially aligned receptacles and openings for releasably securing the backing member to the machine component.

18 Claims, 5 Drawing Sheets

SYSTEM FOR INCREASING STIFFNESS OF A LIGHT-DUTY MACHINE COMPONENT

TECHNICAL FIELD

The present disclosure relates to a system and a method for increasing stiffness and/or strength in a light-duty machine component. More particularly, the present disclosure relates to a retro-fittable system for increasing stiffness and/or strength in a light-duty machine component.

BACKGROUND

Manufacturers of earth moving machines have been manufacturing separate machine components depending on whether the components are for use in a heavy-duty application or a light-duty application. As the magnitude of loads and other forces typically encountered in heavy-duty applications is large, machine components that are configured for use in light-duty applications cannot be used to accomplish jobs associated with the heavy-duty applications.

In order to manufacture machine components to different specifications and meet unique load handling requirements associated with heavy-duty applications and light-duty applications, manufacturers often install separate production lines to produce such machine components. Installation and use of such separate production lines may however, entail increased energy, costs, effort, and time associated with production of the machine components.

U.S. Pat. No. 7,717,442 (hereinafter referred to as "the '442 patent") discloses a suspension system that includes a laterally extending axle and an arm assembly welded to the axle. The arm assembly includes a longitudinally extending arm body having top and bottom surfaces, an axle connector welded to the axle and an end of the arm body, and a plate extending longitudinally over and welded to the arm body top surface, wrapped about and welded to the axle connector, and extending longitudinally over and welded to the arm body bottom surface.

However, it may be noted the system of the '442 patent is configured for use in suspension systems alone. Moreover, the '442 patent does not disclose a retro-fittable system that can be implemented across various types of machine components. Hence, there is a need for a retro-fittable system that can be used for increasing an amount of stiffness and/or strength in existing light-duty machine components and configuring such light-duty machine components for use in heavy-duty applications.

SUMMARY OF THE DISCLOSURE

In an aspect of the present disclosure, a system for increasing stiffness and/or strength of a light-duty machine component having propensity for flexing along an elongated axis is provided. The system includes a pair of receptacles disposed on the machine component, wherein each of the receptacles is located in a spaced apart relation to one another and disposed parallel to the elongated axis. The system further includes at least one backing member corresponding to a distance between the pair of receptacles. The backing member is configured to define at least a pair of openings therethrough. The pair of openings is configured to axially align with the pair of receptacles defined on the machine component. The system further includes a plurality of fasteners such that at least one fastener is received in each pair of axially aligned receptacles and openings for releasably securing the backing member to the machine component.

In another aspect of the present disclosure, the backing member can include a pair of ends that are configured to releasably engage with the pair of receptacles defined on the machine component. Moreover, a portion of the backing member that is disposed partway along a length of the backing member is configured to resiliently abut with the machine component.

In yet another aspect of the present disclosure, a method for increasing stiffness and/or strength of a light-duty machine component having propensity for flexing along an elongated axis includes defining at least a pair of receptacles on the machine component such that each of the receptacles is located in a spaced apart relation to one another and disposed parallel to the elongated axis. The method further includes determining, using sensors provided on the machine component, if the machine component is being used in a light-duty application or a heavy-duty application. If a controller, communicably coupled to the sensors, determines that the machine component has reached a threshold of the heavy-duty application, then the method further includes positioning at least one backing member on the machine component such that a pair of ends on the backing member are configured to releasably engage with the pair of receptacles defined on the machine component; and a portion of the backing member, disposed partway along a length of the backing member, is configured to resiliently abut with the machine component.

Other features and aspects of this disclosure will be apparent from the following description and the accompanying drawings.

DETAILED DESCRIPTION

Wherever possible, the same reference numbers will be used throughout the drawings to refer to same or like parts. Moreover, references to various elements described herein are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
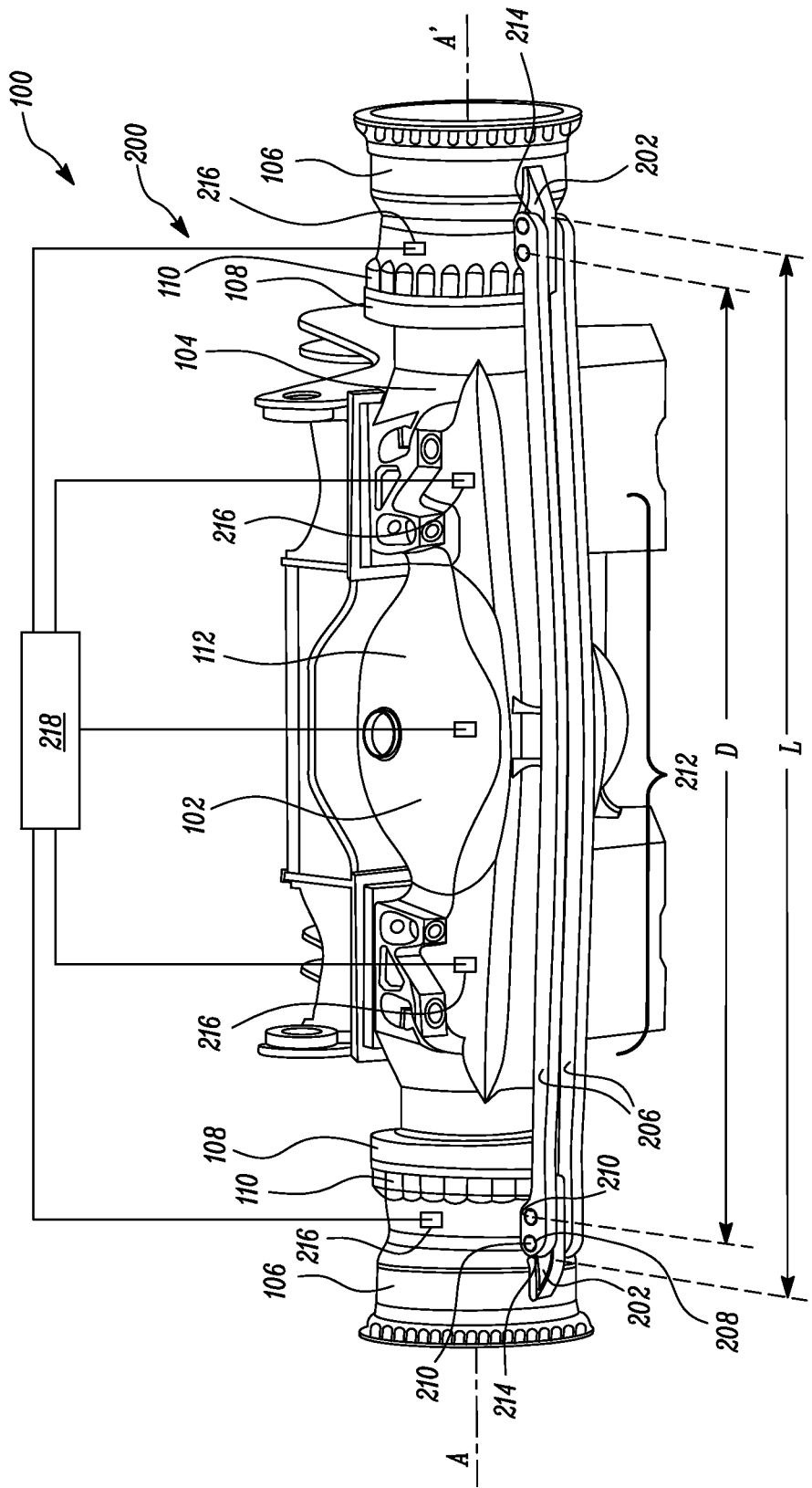
FIG. 1 is a side view of an exemplary light-duty machine component embodied in the form of an axle assembly, in which embodiments of the present disclosure can be implemented.

FIG. 1 illustrates an exemplary machine component 100 that is embodied in the form of an axle assembly. For the sake of simplicity in understanding the present disclosure, the machine component 100 will hereinafter, wherever the context so applies, be referred to as 'the axle assembly' and denoted by identical numeral '100'. The axle assembly 100 can be used in a machine, for e.g., a mining truck (not shown). Moreover, the machine i.e., the mining truck disclosed herein may be used in a variety of applications including mining, quarrying, road construction, construction site preparation, etc. For example, the mining truck of the present disclosure may be employed for hauling earth materials such as soil, debris, or other naturally occurring deposits from a worksite. However, it may be noted that various other types of mobile machines such as, but not limited to, large wheel loaders, off-highway trucks, articulated trucks, on-highway trucks, or the like can be employed in lieu of the mining truck without deviating from the scope of the present disclosure.

Referring to FIG. 1, the axle assembly 100 includes a differential shroud 102 that is coupled to a chassis 104 of the machine. The axle assembly 100 also includes a pair of axle hub housings 106 that are releasably coupled to ends 108 of the differential shroud 102 using fasteners 110 for e.g., a bolt and nut arrangement.

The present disclosure relates to a system 200 for increasing stiffness and/or strength in a light-duty machine component. The terms 'light-duty machine component' disclosed herein is generally representative of a machine component that is capable of withstanding low operational loads and/or forces. For purposes of the present disclosure, the axle assembly is configured to withstand low operational loads and/or forces i.e., the axle assembly alone is configured for a light-duty application and can therefore, be regarded as a light-duty machine component. As such, one skilled in the art will acknowledge by that maximum limits pertaining to the magnitude of the light operational loads and/or forces, if disclosed, are exemplary and non-limiting of this disclosure. These maximum limits of the light operational loads and/or forces can vary from one application to another depending on specific requirements of an application.

As shown in FIG. 1, the axle assembly 100 is generally symmetrical about axis A-A'. Also, for the purposes of the present disclosure, the axle assembly, being a light-duty machine component, may have some propensity to bending about axis A-A' when subject to heavy operational loads and/or forces.

Figure 2:
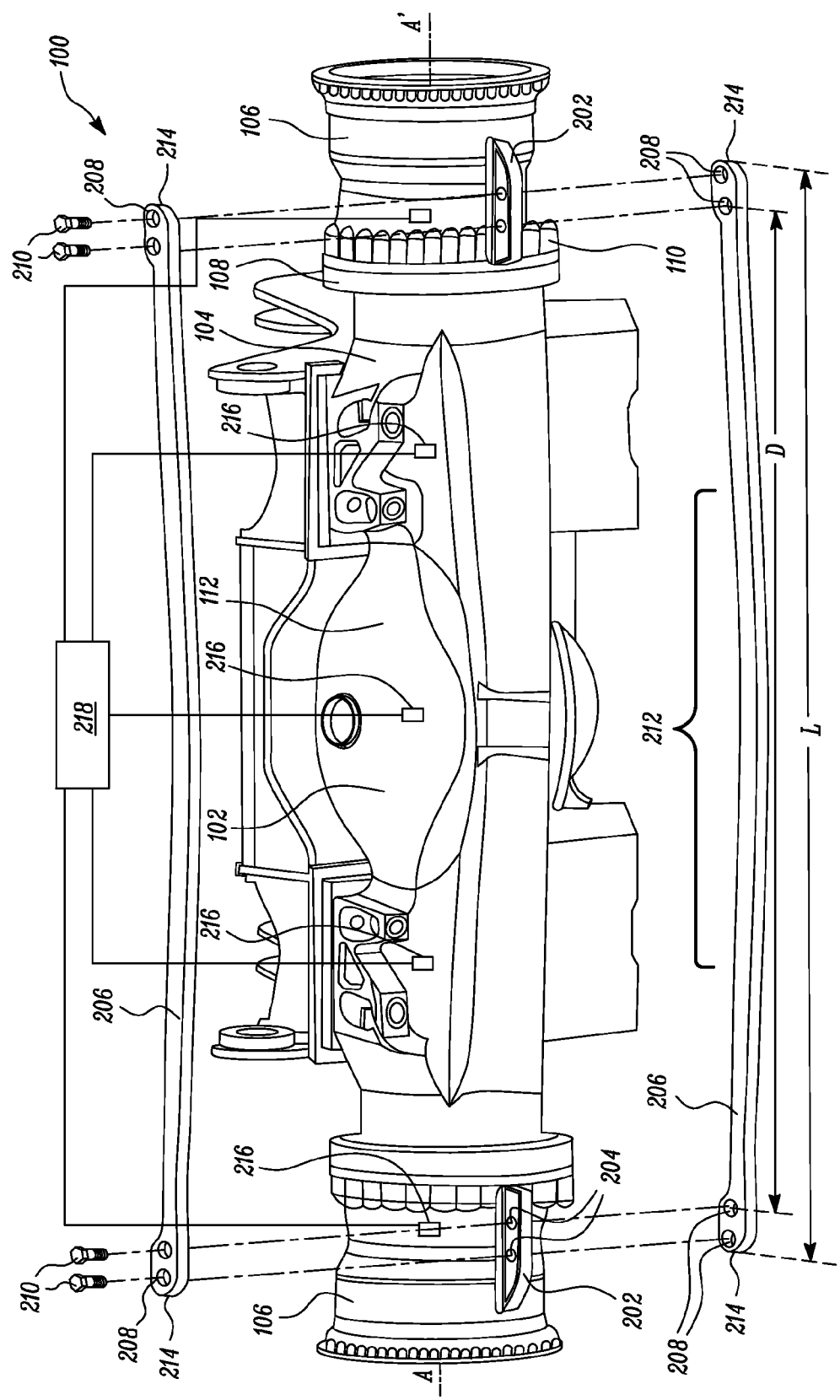
FIG. 2 is a diagrammatic illustration of a system for increasing stiffness and/or strength of a light-duty machine component that can be employed by the exemplary light-duty machine component of FIG. 1 in accordance with an embodiment of the present disclosure.

The system 200 of the present disclosure is directed towards preventing a flexure or limiting a propensity for bending of the axle assembly 100 about axis A-A'. Moreover, the system 200 of the present disclosure is directed towards facilitating the use of a light-duty machine component as a heavy-duty machine component, when desired by operators or when required for use in heavy-duty applications. With reference to FIGS. 1 and 2, the system 200 includes a pair of support members 202 protruding from an outer surface 112 of the machine component 100, in this case, the outer surface 112 of each axle hub housing 106 of the axle assembly 100. As shown, each of the support members 202 is located in a spaced apart relation to one another and disposed parallel to the elongated axis A-A'.

The system 200 further includes at least a pair of receptacles 204 disposed on the support members 202 (See FIG. 2). With the support members 202 being distantly located from one another, each of the receptacles 204 is accordingly located in a spaced apart relation to one another and disposed parallel to the elongated axis A-A'.

The system 200 further includes at least one backing member 206 corresponding to a distance D between the pair of receptacles 204. For example, two backing members 206 are shown in the illustrated embodiments of FIGS. 1 and 2. However, fewer or more backing members 206 could be used depending on specific requirements of an application. The backing members 206 shown in FIGS. 1 and 2 are formed from for e.g., metal bars of a square cross-section. However, the backing members 206 may alternatively be formed from metal bars of a circular cross-section, an elliptical cross-section, or any other type of cross-section commonly known to one skilled in the art.

Each backing member 206 defines at least a pair of openings 208 therethrough such that the pair of openings 208 is configured to axially align with the pair of receptacles 204 defined on the support members 202. The system 200 further includes fasteners 210 that are received in each pair of axially aligned receptacles 204 and openings 208 for releasably securing each of the backing members 206 to the machine component 100. In an embodiment, the receptacles 204, disclosed herein, may be formed with use of for e.g., through-holes defined in the support members 202 while the fasteners 210 may include a bolt and nut arrangement.

In an aspect of the present disclosure, a portion 212 of the backing member 206, disposed partway along a length L of the backing member 206, could be configured to resiliently abut with the machine component 100. This way, the backing member 206 can operably resist flexing of the machine component 100 i.e., the axle assembly 100 along the elongated axis A-A'.

Figure 3:
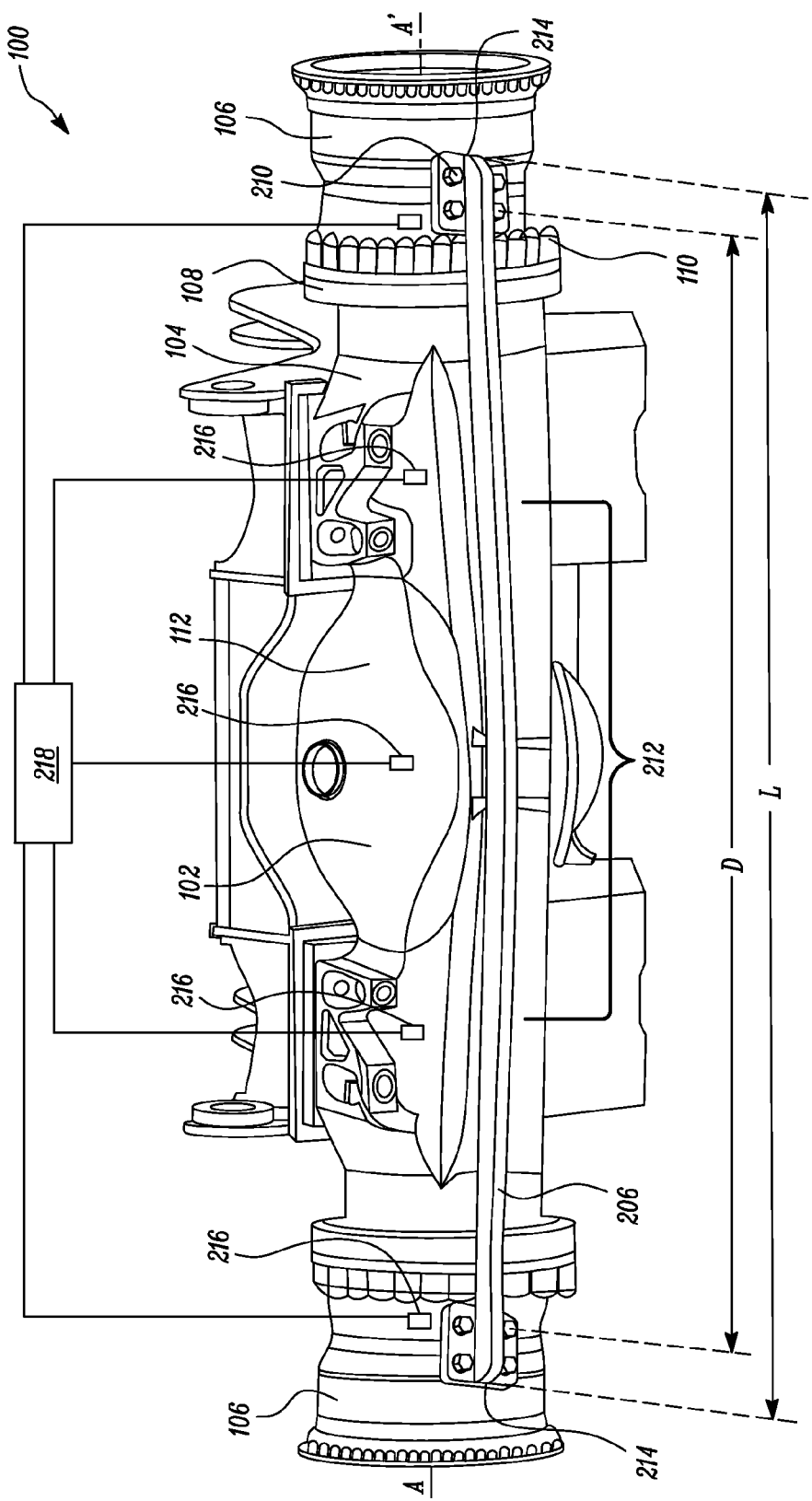
FIG. 3 is a diagrammatic illustration of a system for increasing stiffness and/or strength of a light-duty machine component that can be employed by the exemplary light-duty machine component of FIG. 1 in accordance with another embodiment of the present disclosure.

Although it is disclosed herein that the support members 202 are disposed on the outer surface 112 of the machine component 100, and that the receptacles 204 are located on the support members 202, it will be appreciated that in other embodiments of the present disclosure, the receptacles 204 can be directly defined and located on the outer surface 112 of the machine component 100 thereby allowing one skilled in the art to do away with use of the support members 202. An exemplary configuration of such an embodiment is shown in the illustration of FIG. 3 in which the receptacles 204 are directly provided on the outer surface 112 of each axle hub housing 106. Moreover, ends 214 of the backing member 206 are configured to releasably engage with the pair of receptacles 204 defined on the machine component 100 itself.

In this embodiment, the receptacles 204 and the ends 214 of the backing member 206 may be configured so as to accomplish a releasable engagement and dis-engagement using commonly known structures such as, but not limited to, latches, sockets, bayonet lock connectors, pawls, ratchets, clasping mechanisms, and/or other interlocking mechanisms known to one skilled in the art. However, in an alternative embodiment as shown in FIG. 3, the receptacles 204 may be defined on the machine component 100, in this case, the axle hub housings 106 by way of tapped blind holes; while the fasteners 210 may include bolts that releasably secure with the tapped blind holes defined on the machine component 100.

Referring again to FIG. 2, the system 200 may, additionally or optionally, include sensors 216 that are disposed on the machine component 100, in this case, the differential shroud 102 and the axle hub housings 106 of the axle assembly 100. These sensors 216 are beneficially configured to measure an amount of operative load on the machine component 100, and provide a feedback based on the measured operative load. The feedback received from the sensors 216 is generally determinative of releasably affixing additional backing members 206 to the machine component 100.

For example, if the sensors 216 provided on the machine component 100 record operational loads that are lower in magnitude than threshold values (pre-determined or known-beforehand) for the given machine component 100, then feedback from the sensors 216 would be indicative of the machine component 100 performing as intended and that no backing members 206 or additional backing members 206 are required for supporting the machine component 100 against overload. However, if the sensors 216 record operational loads that are equal to or greater than the threshold values for the given machine component 100, then the sensors 216 could beneficially provide feedback that is suggestive of adding more backing members 206 to the machine component 100 and increasing the amount of stiffness and/or strength in the machine component 100. This way, feedback from the sensors 216 can beneficially assist in the determination of whether additional backing members 206 are required for mounting onto the machine component 100 or not depending on the magnitude of operational loads and/or forces encountered by the machine component 100.

Moreover, as shown in FIGS. 2 and 3, the sensors 216 can be further connected and disposed in communication with a controller 218. The sensors 216 may be beneficially configured to send signals indicative of the load measured on the machine component 100 to the controller 218. The controller 218 may then present to an operator of the machine, the loads on the machine component 100. In an additional embodiment, the controller 218 may further present to the operator, an output that indicates whether one or more backing members 206 are required on the machine component 100.

The controller 218 disclosed herein may be an electronic controller that operates in a logical fashion to perform operations, execute control algorithms, store and retrieve data and other desired operations. The controller 218 may include or access memory, secondary storage devices, processors, and any other components for running an application. The memory and secondary storage devices may be in the form of read-only memory (ROM) or random access memory (RAM) or integrated circuitry that is accessible by the controller 218. Various other circuits may be associated with the controller 218 such as power supply circuitry, signal conditioning circuitry, driver circuitry, and other types of circuitry. In an example, the controller 218 disclosed herein can be embodied in the form of a graphical user interface (GUI) (not shown) or any other type of visual or audio rendering device known to persons skilled in the art.

The controller 218 may be a single controller or may include more than one controller disposed to control various functions and/or features of the sensors 216 and/or the machine. The term "controller" is meant to be used in its broadest sense to include one or more controllers and/or microprocessors that may be associated with the machine and that may cooperate in controlling various functions and operations of the machine. The functionality of the controller 218 may be implemented in hardware and/or software without regard to the functionality employed. The controller 218 may also use one or more data maps relating to the operating conditions of the machine component 100 that may be stored in the memory of the controller 218. Such data maps may be obtained from theoretical models, statistical models, experimental test data, or any other data source pertaining to a specific application and/or type of machine component.

Figure 4:
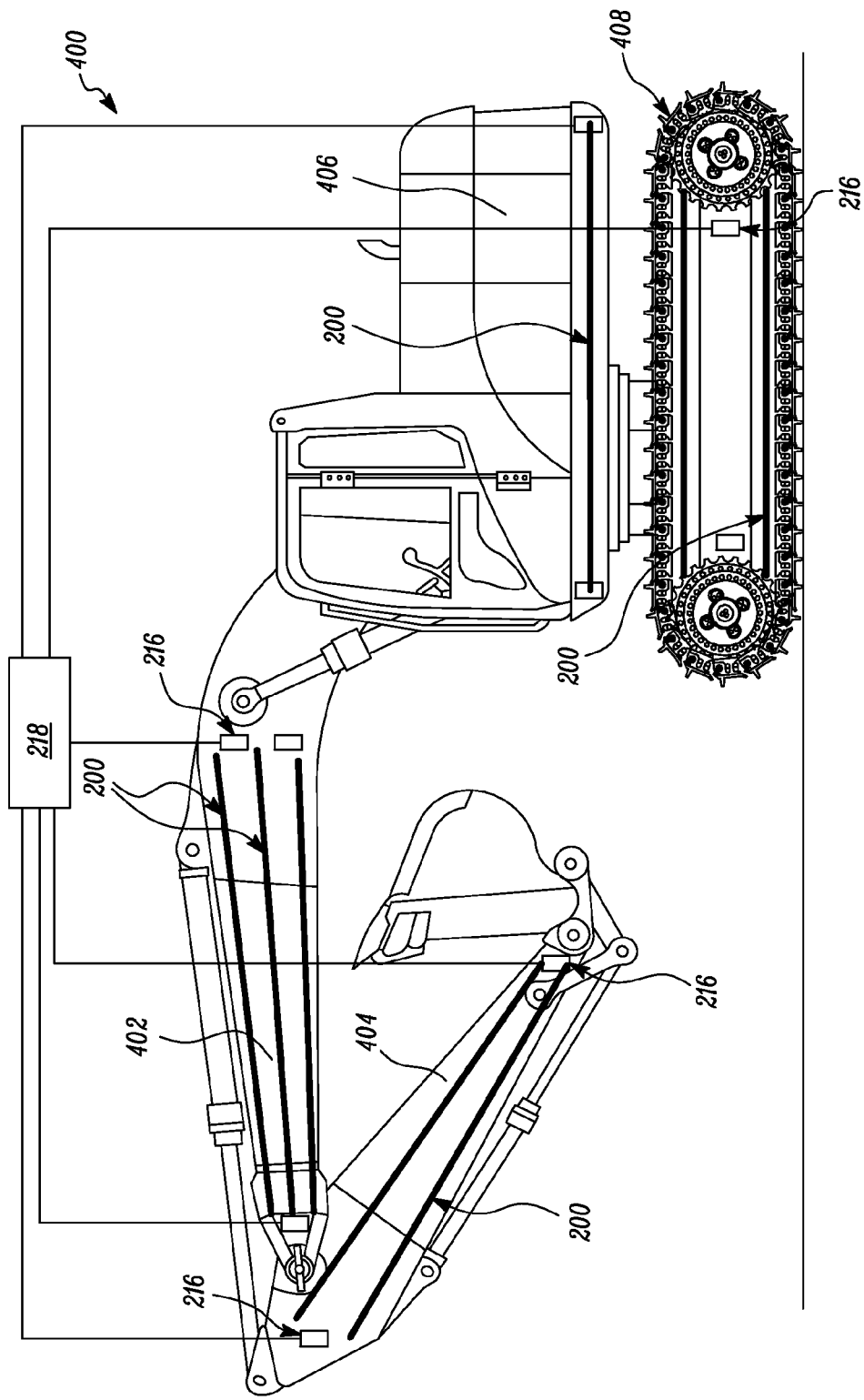
FIG. 4 is an exemplary machine showing various locations of machine components to which the systems of the present disclosure can be applied in accordance with embodiments disclosed herein.

FIG. 4 shows an exemplary machine 400 to which the system 200 of the present disclosure can be applied at various locations and/or machine components of the machine 400. The exemplary machine 400 of FIG. 4 is embodied in a form of a tracked excavator. However, as disclosed earlier herein, a type of machine used is merely exemplary in nature and hence, non-limiting of this disclosure. Any type of machine may be used in lieu of the tracked excavator disclosed herein without deviating from the scope of the present disclosure.

As shown in FIG. 4, the tracked excavator 400 has machine components including, but not limited to, a boom 402, a stick 404, an engine enclosure 406, and a crawler axle assembly 408. As these machine components 402, 404, 406, and/or 408 are likely to encounter operational loads varying from light-loads to heavy loads, the system 200 of the present disclosure may be mounted onto each of these machine components 402, 404, 406, and/or 408 to increase a stiffness and/or strength of the respective machine components 402, 404, 406, and/or 408. It may be noted that, as shown in FIG. 4, any number of systems 200 disclosed herein can be implemented onto a given machine component 100 to increase its stiffness and/or strength to an adequate or required value so that the given machine component 100 is able to withstand any increase in the magnitude of operational loads and/or forces thereon.

Figure 5:
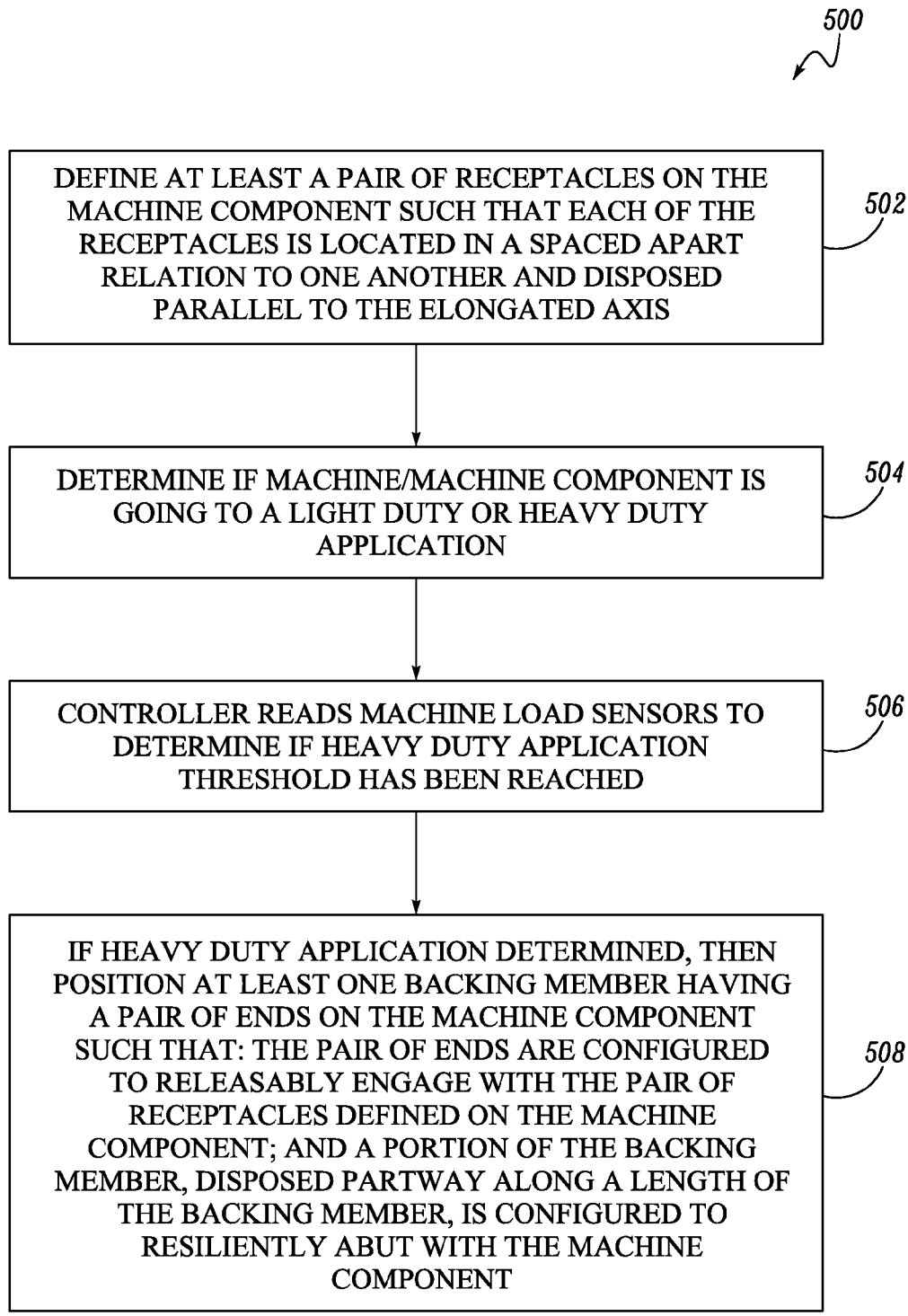
FIG. 5 is a flowchart depicting a method for increasing stiffness and/or strength in a light-duty machine component, in accordance with embodiments of the present disclosure.

FIG. 5 illustrates a method 500 for increasing stiffness and/or strength in a light-duty machine component having propensity for bending along an elongated axis A-A', in accordance with embodiments of the present disclosure. As shown in FIG. 5, at step 502, the method 500 includes defining the pair of receptacles 204 on the machine component 100 such that each of the receptacles 204 is located in a spaced apart relation to one another and disposed parallel to the elongated axis A-A'.

At step 504, the method 500 further includes determining, using sensors 216 provided on the machine component 100, if the machine component 100 is being used in a light-duty application or a heavy-duty application. At step 506, if the controller 218 determines that the machine component has reached a threshold of the heavy-duty application, then at step 508, the method 500 further includes positioning the backing member 206 on the machine component 100 such that the pair of ends 214 of the backing member 206 are configured to releasably engage with the pair of receptacles 204 defined on the machine component 100; and the portion 212 of the backing member 206, disposed partway along the length L of the backing member 206, is configured to resiliently abut with the machine component 100.

The method 500 of the present disclosure also includes defining the backing member 206 with the pair of openings 208 therethrough such that the pair of openings 208 is disposed in axial alignment with the pair of receptacles 204 defined on the machine component 100. Moreover, the method 500 also includes releasably securing the backing member 206 to the machine component 100 by providing fasteners 210 such that at least one fastener is received in each pair of axially aligned receptacles 204 and openings 208.

In an embodiment of this disclosure, the method 500 could alternately include defining the pair of support members 202 on the outer surface 112 of the machine component 100 such that each of the support members 202 are located in a spaced apart relation to one another and disposed parallel to the elongated axis A-A' of the machine component 100. Moreover, in this embodiment, the receptacles 204 could be located on the pair of support members 202.

In one embodiment, the method 500 could further include disposing one or more sensors 216 on the machine component 100 for measuring the amount of operative load on the machine component 100; and providing feedback based on the measured operative load, the feedback from the sensors 216 being determinative of whether additional backing members 206 should be releasably affixed to the machine component 100 or not.

Various embodiments disclosed herein are to be taken in the illustrative and explanatory sense, and should in no way be construed as limiting of the present disclosure. All joinder references (e.g., attached, affixed, coupled, engaged, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

Embodiments of the present disclosure have applicability for use and implementation in increasing an amount of stiffness and/or strength of existing machine components, esp. light-duty machine components.

With use of embodiments disclosed herein, manufacturers of machine components can standardize the production of machine components to light-duty machine components. Thereafter, with use of the system 200 disclosed herein, operators, service personnel, and/or technicians can easily retro-fit the system 200 onto the light-duty machine components and facilitate use of such machine components as heavy-duty machine components i.e., for use in heavy-duty applications. Therefore, embodiments disclosed herein obviate the need for separate manufacturing or production lines to distinctly produce light-duty machine components and heavy-duty machine components. Further, embodiments of the present disclosure also have applicability for use and implementation in reducing costs, energy, effort, and labor previously associated with production of machine components to distinct specifications or configurations depending on the specific requirements of an application for e.g., depending on whether the application is a light-duty application or a heavy-duty application.

While aspects of the present disclosure have been particularly shown and described with reference to the embodiments above, it will be understood by those skilled in the art that various additional embodiments may be contemplated by the modification of the disclosed machines, systems, methods and processes without departing from the spirit and scope of what is disclosed. Such embodiments should be understood to fall within the scope of the present disclosure as determined based upon the claims and any equivalents thereof.

What is claimed is:

1. A system for increasing stiffness of a single light-duty machine component having propensity for flexing along an elongated axis, the system comprising:
 a pair of support members protruding from an outer surface of the single machine component and having at least a pair of receptacles located thereon, the support members being spaced apart relation to one another and disposed on opposite ends of the single machine component, wherein each of the support members is located in a spaced apart relation to one another and disposed parallel to the elongated axis;
 at least one backing member corresponding to a distance between the pair of receptacles, the backing member defining at least a pair of openings therethrough, wherein the pair of openings are configured to axially align with the pair of receptacles defined on the single machine component; and
 a plurality of fasteners, wherein at least one fastener is received in each pair of axially aligned receptacles and openings for releasably securing the backing member to the single machine component.

2. The system of claim 1, wherein the backing member is configured to operably resist flexing of the single machine component along the elongated axis.

3. The system of claim 1, wherein the receptacles are defined on an outer surface of the single machine component.

4. The system of claim 1, wherein a portion of the backing member, disposed partway along a length of the backing member, is configured to resiliently abut with the single machine component.

5. The system of claim 1 further comprising a plurality of sensors disposed on the machine component, the sensors configured to:
 measure an amount of operative load on the single machine component; and
 provide feedback based on the measured operative load.

6. The system of claim 5, wherein the feedback from the sensors is determinative of releasably affixing additional backing members to the single machine component.

7. A system for increasing stiffness of a light-duty machine component having propensity for flexing along an elongated axis, the system comprising:
 at least a pair of receptacles disposed on the machine component, wherein each of the receptacles is located in a spaced apart relation to one another and disposed parallel to the elongated axis; and
 at least one backing member corresponding to a distance between the pair of receptacles, the backing member including:
  a pair of ends configured to releasably engage with the pair of receptacles defined on the machine component; and a portion of the backing member disposed partway along a length of the backing member, the portion configured to resiliently abut with the machine component.

8. The system of claim 7, wherein the backing member is configured to operably resist flexing of the machine component along the elongated axis.

9. The system of claim 7 further comprising at least a pair of support members protruding from an outer surface of the machine component, wherein each of the support members is located in a spaced apart relation to one another and disposed parallel to the elongated axis.

10. The system of claim 9, wherein the receptacles are located on the support members.

11. The system of claim 7, wherein the receptacles are defined on an outer surface of the machine component.

12. The system of claim 7 further comprising a plurality of sensors disposed on the machine component, the sensors configured to:
measure an amount of operative load on the machine component; and
provide feedback based on the measured operative load.

13. The system of claim 12, wherein the feedback from the sensors is determinative of releasably affixing additional backing members to the machine component.

14. A method for increasing stiffness of a light-duty machine component having propensity for flexing along an elongated axis, the method comprising:
defining at least a pair of receptacles on the machine component such that each of the receptacles is located in a spaced apart relation to one another and disposed parallel to the elongated axis;
determining, using sensors provided on the machine component, if the machine component is being used in a light-duty application or a heavy-duty application;
if a controller, communicably coupled to the sensors, determines that the machine component has reached a threshold of the heavy-duty application, then positioning at least one backing member on the machine component such that:
a pair of ends of the backing member are configured to releasably engage with the pair of receptacles defined on the machine component; and
a portion of the backing member, disposed partway along a length of the backing member, is configured to resiliently abut with the machine component.

15. The method of claim 14 further comprising defining at least a pair of support members on an outer surface of the machine component, each of the support members being located in a spaced apart relation to one another and disposed parallel to the elongated axis, wherein the pair of receptacles are located on the pair of support members.

16. The method of claim 14 further comprising defining the backing member with at least a pair of openings therethrough, the pair of openings configured to axially align with the pair of receptacles defined on the machine component.

17. The method of claim 14 further comprising releasably securing the backing member to the machine component by providing a plurality of fasteners, wherein at least one fastener is received in each pair of axially aligned receptacles and openings.

18. The method of claim 14, wherein the sensors on the machine component are configured to:
measure an amount of operative load on the machine component; and
provide feedback based on the measured operative load, wherein the feedback from the sensors is determinative of releasably affixing additional backing members to the machine component.

* * * * *